Jan. 17, 1928.
E. R. EVANS
1,656,370
ELECTRICAL SYSTEM
Filed Feb. 21, 1924
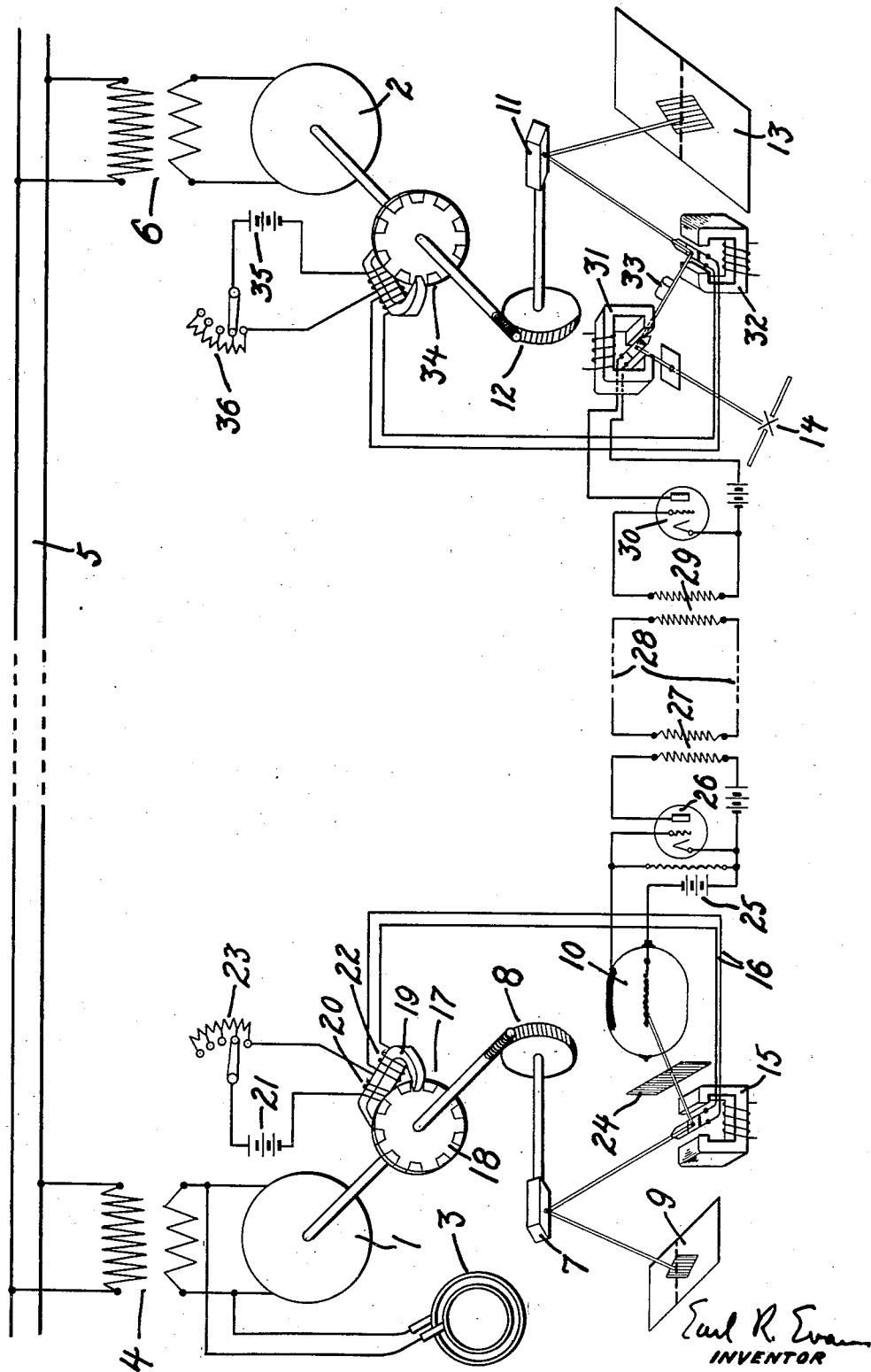
Earl R. Evans
INVENTOR Patented Jan. 17, 1928.

1,656,370

UNITED STATES PATENT OFFICE.

EARL R. EVANS, OF GALION, OHIO.

ELECTRICAL SYSTEM.

Application filed February 21, 1924. Serial No. 694,226.

My invention relates to electrical systems for controlling mechanism that operates with a high degree of accuracy and certainty at great speeds, particularly where the control must be exercised over long distances. For relatively short distances, a low potential electric current flowing through a metallic circuit has been used for many purposes, such as for signalling or for the telegraphic transmission of intelligence. When the control circuit is more than a few miles in length however the electrical characteristics of the circuit introduce difficulties. The effect of the resistance, inductance and capacity of the electrical conductors upon the current flowing in the circuit is a well recognized phenomenon and the fact that the distortion of the current is more pronounced as the rate of change of the current increases is equally well understood. The physical laws governing the flow of current in the simple metallic circuit have therefore placed a perfectly definite limitation upon its use in controlling systems where an appreciable distortion of the current received renders the operation faulty or defective.

It has been found practicable to transmit alternating current over extremely long distances by the use of voltages of the order of 200,000 or more and by the provision of apparatus such as synchronous condensers connected to the transmission circuit at certain points to correct or modify the phase displacement of the current. In the embodiment of my invention described herein, I have utilized this alternating current power transmission system for operating synchronous motors at the sending and receiving ends of the system. These synchronous motors move at exactly the same speed and are employed to operate the elements of the sending and receiving mechanism that are required to function simultaneously or in synchronism. The ultimate object of the system described herein is the electrical transmission of light images or pictures, and it is the main object of my invention to improve such systems generally. But it is apparent that the underlying features of my invention will find application in other electrical systems having different specific objects in view and therefore I consider that it includes such application within its scope.

It has also been found practicable to transmit small variable currents over long distances by the interposition of vacuum tube amplifiers at intervals in the circuit, the distortion being reduced to some extent by the use of lumped inductances. For instance, long distance telephone lines contain vacuum tube repeaters and Pupin loading coils. Such an installation is described in the October, 1923, issue of the Journal of the American Institute of Electrical Engineers. The introduction of the loading coils increases the time lag of the received currents. It is not practicable to transmit more than a very small amount of power over such a circuit on account of the nature of the repeaters and loading coils. It may be used however to transmit a small controlling current, the elements of the system which must be in synchronism being driven as stated above through a high tension power transmission system. Strictly speaking, the so-called "synchronous" elements of the system may not operate in exact synchronism if the controlling circuit introduces a time lag in the control current. Such a condition causes no difficulty in the system of my invention since the mentioned elements are driven at an invariable speed and the time lag of the circuit is practically constant and may be compensated for by manual adjustment. With this understanding, the elements referred to will be described herein as being in synchronism.

In accordance with my invention, mechanism such as that used in the transmission of intelligence is driven at the sending and receiving stations by synchronous motors fed from a common source or from sources maintained in synchronism through a high tension transmission line. The operation of the mechanism at the receiving station is modified in the desired manner by a control current transmitted from the sending station over a separate control channel of any well known type, such as wire, wired-wireless or radio.

For the purpose of electrically transmitting images or pictures in rapid succession so as to produce the effect of a "moving" picture, which is the primary object of this invention, resolving mechanism is provided at the sending station which periodically "resolves" the image to be transmitted into its component parts and produces a varying electrical potential corresponding to the light intensity of the various parts of the image taken in a predetermined order. At the receiving station reproducing mechanism periodically reconstructs the images, synchronism between the resolving and reproducing mechanism being accomplished as above described. An electrical light-responsive device with practically no time lag, such as a photo-electric cell, is required at the sending station. The varying current produced by this light-responsive device is amplified without distortion by vacuum tube amplifiers and transmitted over a suitable channel to the receiving station. The light source for the reproducing mechanism at the receiving station is varied in accordance with the controlling current, with the result that the image or picture is faithfully reproduced at the receiving point. By superimposing successive images very rapidly, pictures of moving objects may be successfully transmitted, and if necessary over long distances by reason of the above-mentioned character of the connecting circuits.

The nature of my invention may be readily comprehended from the following detailed description of an embodiment of my invention illustrated in the accompanying drawing.

The drawing shows schematically circuits and apparatus adapted to transmit electrically pictures or images of any kind, the sending station being shown at the left and the receiving station at the right.

The mechanism at the sending and receiving stations is driven by two synchronous motors, 1 and 2, respectively. These motors rotate at precisely the same rate of speed, being driven by a common alternating current source 3. On account of the distance separating the sending and receiving stations, a step-up transformer 4 is used to raise the potential of the alternator 3 so that the power required for driving 2 may be transmitted over this distance. A high tension transmission line 5 connects the sending and receiving stations. A step-down transformer 6 reduces the transmission potential to a suitable value for driving the motor 2. This voltage may be, for example, from 100 to 500 volts, whereas the transmission potential will vary from a few thousand to 200,000 volts or more, depending upon the distance.

The synchronous motors 1 and 2 revolve at the same speed because, as is well known, the speed of motors of this type is fixed absolutely by the frequency of the driving current. In the transmission of alternating current over any physical path only the frequency remains unchanged. All of the other characteristics of the current are altered in some degree. The advantage of utilizing the invariable characteristic of the current for the described purposes is apparent. Electrical disturbances in or near the transmission circuits might conceivably cause momentary fluctuations of the frequency, but these would be minimized by the mechanical inertia of the rotating parts which may be made as great as desired by increasing the rotative mass.

Obviously the source 3 might be located at the receiving station, or there might be separated sources at each end which would be the equivalent of the arrangement shown because synchronism would be maintained by the flow of power or of current over the high tension line. Furthermore in the case of long transmission lines, synchronous condensers or other apparatus (not shown) may be employed at points along the line to increase the transmission efficiency or the distance to which power may be economically transmitted.

The motor 1 at the sending station rotates a mirror 7 by means of suitable reduction gearing 8 as shown, the mirror 7 being arranged to reflect successive portions of a picture or image 9 which is to be transmitted to the receiving station upon a light-responsive device 10. At the receiving station, the motor 2 rotates a corresponding mirror 11 by means of similar gearing 12 to reconstruct the desired image as at 13 with a source of light 14.

Interposed between the rotating mirror 7 and the photo-electric cell 10 is an oscillograph 15. This oscillograph is of the same type as that used to observe alternating current phenomena and comprises a sensitive, highly damped mirror suspension between the poles of a strong electromagnet. The mirror suspension is a loop of wire under tension receiving current through conductors 16 from a source 17. The generator 17 comprises a steel disc 18 rotated by the motor 1 between the pole pieces of a field magnet 19. The disc 18 has a toothed periphery, inserts of non-magnetic material being wedged between the teeth. As the disc 18 revolves, the magnetic reluctance of the field is periodically varied. The field being energized by a winding 20 and current source 21, a variable current is induced in the winding 22 by the variable flux threading the core 19. This variable current alternates in direction at a high frequency. The teeth of the disc 18 and the core 19 are so positioned and proportioned that the rate of change of the current is substantially uniform but with suitable allowance made for the electrical inertia of the circuit 16 and for the mechanical inertia of the oscillograph 15. In this way it is possible to vibrate the movable element of the oscillograph very rapidly and at a practically uniform rate over the greater part of its travel. The amplitude of the movement of the oscillograph mirror may be adjusted by means of the variable resistance 23 controlling the magnetization of the core 19.

The movement of the oscillograph mirror being at a right angle to and at a much greater speed than the movement of the mirror 7, it is apparent that the two co-operate to reflect successive portions of the image 9 through the screen 24 upon the photo-electric cell 10. The entire image is reflected in a fraction of a second and then repeated upon the presentation of the next face of the mirror 7 as it rotates. The screen 24 absorbs the invisible radiation which would affect the cell 10, so that the electrical energy in the output circuit of the cell is in proportion to the visible light rays which impinge upon it. The screen or filter 24 may be a yellow filter when a barium photo-electric cell is used. The barium cell comprises a photo-active deposit of barium and a suitable conducting filament within a highly evacuated glass bulb. Although this type of cell is the most satisfactory, any cell that is sufficiently rapid in its response and constant in its characteristics may be used.

A battery 25 is connected to the photo-electric cell 10 and the fluctuations of current through the cell are amplified by the three-electrode vacuum tube amplifier 26. The amplified current is transmitted through the transformer 27, the conductors 28 of a connecting circuit, and the transformer 29 to the vacuum tube amplifier 30. Obviously, any known means such as that described in the article referred to above may be employed to decrease the distortion of the current or increase the distance to which it may be successfully transmitted. Furthermore, the current may be used to modulate a high frequency carrier current or the transmitting current in a radiant energy signalling circuit, so as to transmit the signals by what is popularly termed "wireless" or "wired wireless". Any desired modulation system, such as those used in telephone transmission systems, may be employed in this connection.

The amplified current from the vacuum tube 30 is used to actuate the mirror suspension of the oscillograph 31, which is similar to the oscillograph 15. The oscillograph mirror vibrates in accordance with the variations of current and produces a corresponding variation of the intensity of the light from the source 14 striking the mirror of the receiver oscillograph 32. A glass prism 33 is placed adjacent the path of the beam of light between the oscillographs 31 and 32, so as to cause a gradual dispersion of the light as the beam is deflected. It will be apparent that the intensity of the beam of light striking the mirror of the receiver oscillograph 32 is varied in accordance with the variations of intensity of the beam of light reflected from the transmitter oscillograph 15 upon the photo-electric cell 10, the mirror 11 rotated in synchronism with the mirror 7, and the vibrating mirrors of the oscillographs 15 and 32 actuated in synchronism. Accordingly the image 9 is reproduced as at 13, the operation being repeated at the rate of approximately 20-40 times per second so as to permit the transmission of moving pictures if desired. The mirror suspension of the receiver oscillograph 32 is actuated by alternating current from the source 34 which is arranged in the same way as the device 17 and is driven by the motor 2. The field of the generator 34 is energized from the battery 35 in series with the variable resistance 36 for adjusting the amplitude of the vibrations of 32 as desired.

It will be seen that I have devised a system for the electrical transmission of intelligence or, more specifically, for the transmission of pictures of objects which does not require elaborate synchronizing devices at either the sending or receiving station. The a mayor part of the mechanism at both sending and receiving stations is driven by synchronous motors from the common alternating current power system. A small controlling current is sent to the receiving station over any available wire or radiant energy channel, permitting a large number of receiving stations to be operated simultaneously if desired by the use of the well known wire or wireless telephone transmitting apparatus, the character of the controlling current resembling that used in telephonic communication.

I claim:

1. A system of the character described comprising a receiving station, a light source thereat and means for varying the intensity of a beam from said source comprising electromagnetic means for deflecting the beam from the useful path in accordance with received currents and prismatic means for obtaining a desired dispersion of the deflected beam.

2. A system of the character described comprising a long, power transmission channel transmitting energy at a potential of the order of 100,000 volts, a parallel low-energy transmission channel, synchronous means operated over said power channel and controlling means therefor operated over said low-energy channel.

3. A system of the character described comprising image resolving and reproducing apparatus, a power transmission channel transmitting energy at a potential of the order of 100,000 volts extending between said resolving and said reproducing apparatus, means including said power transmission channel for maintaining synchronism between said resolving and said reproducing apparatus, a separate low-energy transmission channel and means for controlling said reproducing apparatus over said low-energy transmission channel in accordance with the operation of said resolving apparatus.

In testimony whereof I affix my signature.

EARL R. EVANS.